United States Patent [19] | [11] 4,202,684
Arndt et al. | [45] May 13, 1980

[54] CARBANILIC ACID ESTERS, PROCESS FOR MAKING THE SAME AND HERBICIDAL COMPOSITIONS CONTAINING SAME

[75] Inventors: Friedrich Arndt; Gerhard Boroschewski, both of Berlin, Fed. Rep. of Germany

[73] Assignee: Schering Aktiengesellschaft, Berlin & Bergkamen, Fed. Rep. of Germany

[21] Appl. No.: 936,477

[22] Filed: Aug. 24, 1978

Related U.S. Application Data

[63] Continuation-in-part of Ser. No. 730,716, Oct. 8, 1976, abandoned.

[30] Foreign Application Priority Data

Dec. 18, 1975 [DE] Fed. Rep. of Germany ....... 2557552

[51] Int. Cl.[2] ...................... A01N 9/12; C01C 125/06

[52] U.S. Cl. ...................................... 71/100; 71/111; 260/455 A; 560/29

[58] Field of Search .................... 560/29; 260/455 A; 71/100, 111

[56] References Cited

U.S. PATENT DOCUMENTS

| | | | |
|---|---|---|---|
| 3,404,975 | 10/1968 | Wilson et al. | 560/29 |
| 3,450,745 | 6/1969 | Payne, Jr. et al. | 560/29 |
| 3,898,075 | 8/1975 | Freund et al. | 560/29 |
| 3,901,936 | 8/1975 | Boroschewski | 560/29 |
| 3,904,396 | 9/1975 | Boroschewski et al. | 560/29 |
| 3,904,669 | 9/1975 | Boroschewski et al. | 560/29 |
| 3,920,829 | 11/1975 | Rohr et al. | 560/29 |
| 4,065,293 | 12/1977 | Boroschewski et al. | 71/100 |

FOREIGN PATENT DOCUMENTS

| | | | |
|---|---|---|---|
| 2413933 | 9/1975 | Fed. Rep. of Germany | 560/29 |

*Primary Examiner*—Howard T. Mars
*Assistant Examiner*—G. T. Breitenstein
*Attorney, Agent, or Firm*—Michael J. Striker

[57] ABSTRACT

Carbanilic acid esters of the formula

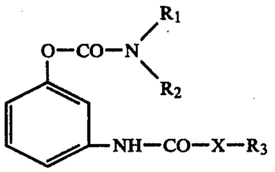

in which $R_1$ is chloro- or bromoalkyl, $R_2$ is phenyl, methylphenyl, halogenophenyl, trifluoromethylphenyl or methoxyphenyl, $R_3$ is alkyl, alkenyl or alkinyl, and in which X is oxygen or sulfur.

The compounds have a high activity against various weeds with good compatibility with many agricultural plants, particularly potatoes.

The invention also embraces a process for making the aforementioned compounds as well as herbicidal compositions in which the compounds are the active or one of the active agents.

26 Claims, No Drawings

CARBANILIC ACID ESTERS, PROCESS FOR MAKING THE SAME AND HERBICIDAL COMPOSITIONS CONTAINING SAME

This application is a continuation-in-part of Ser. No. 730,716, filed 10/8/76, now abandoned.

BACKGROUND OF THE INVENTION

The invention relates to carbanilic acid esters, herbicidal compositions in which these esters are the active agents or one of the active agents and to a process for making the compounds.

The selective-herbicidal action of certain carbamoyl amino compounds is known (see e.g. German Pat. No. 1,567,151). However, it has been impossible to obtain a satisfactory action with these compounds against particularly resistant weeds such as Amarantus sp., *Galium aparine* and *Poa annua*, and also to accomplish an adequate selectivity for various types of grains (cereals) and potatoes.

Carbamates have also been disclosed as herbicidal agents in German application No. 24 13 933. These compounds were carbamoyl amino substituted carbamates. Among the substituents of the carbamoyl group in the terminal position were alkyl, cycloalkyl, halongenated alkyl, phenyl and benzyl.

It has now unexpectedly been found that with a carbanilic acid ester as the core of the compound the combination of a halongenated alkyl group with the phenyl group of the carbanilic acid, both attached to the nitrogen atom of the amino group of the carbamoyloxy radical an ester compound can be formed which, without losing its high activity against a broad spectrum of weeds and its selectivity to many grains, is also highly compatible with potatoes—a property not satisfactorily met by the prior art compounds.

SUMMARY OF THE INVENTION

Accordingly, the compounds of the present invention are carbanilic acid esters of the formula

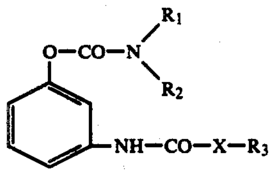

in which $R_1$ is chloro- or bromo alkyl, $R_2$ is phenyl, methylphenyl, halogenophenyl, trifluoromethylphenyl or methoxyphenyl, $R_3$ is alkyl, alkenyl or alkinyl, all of these having 1 to 4 carbons and in which X is oxygen or sulfur.

This combination of the haloalkyl group ($R_1$) and the phenyl or substituted phenyl group ($R_2$) in a carbanilic acid ester results in the highly unpredictable properties particularly compatibility with potatoes.

The compounds are characterized by a surprisingly high compatibility in relation not only to potatoes, but also to various types of grains, maize and rice.

The highly resistant weeds against which the compound are effective are for instance Amarantus sp., *Galium aparine, Poa annua, Echinochloa crus galli,* Setaria, *Digitaria sanguinalis* and *Avena fatua.*

The compounds are best applied by post-emergence application. The herbicidal activity in this case is effective for many types of plants, such as for instance *Stellaria media, Senecio vulgaris, Lamium amplexicaule, Centaurea cyanus, Amarantus retroflexus, Chrysanthemum segetum,* Ipomea sp., *Polygonum lapathifolium, Galium aparine, Setaria italica, Poa annua, Echinochloa crus galli, Digitaria sanguinalis, Avena fatua* and *Alopecurus myosuroides.*

The amounts used for a selective activity against weeds are generally about 0.5 to 5 kg of active agent per about 2.5 acres (1hectare).

PREFERRED EMBODIMENTS

Preferred compounds of the invention are the following:

N-(2-bromoethyl)-carbanilic acid-[3-(methoxycarbonylamino)-phenyl]-ester,
N-(2-bromoethyl)-carbanilic acid-[3-(ethoxycarbonylamino)-phenyl]-ester,
N-(2-bromoethyl)-carbanilic acid-[3-(methylthiocarbonylamino)-phenyl]-ester,
N-(2-bromoethyl)-carbanilic acid-[3-(ethylthiocarbonylamino)-phenyl]-ester,
N-(2-chloroethyl)-carbanilic acid [3-(methoxycarbonylamino)-phenyl]-ester,
N-(2-chloroethyl)-carbanilic acid-[3-(ethoxycarbonylamino)-phenyl]-ester,
N-(2-chloroethyl)-carbanilic acid-[3-(methylthiocarbonylamino)-phenyl]-ester,
N-(2-chloroethyl)-carbanilic acid [3-(ethylthiocarbonylamino)-phenyl]-ester,
N-(2-bromoethyl)-carbanilic acid-[3-(allyloxycarbonylamino)-phenyl]-ester,
N-(2-chloroethyl)-carbanilic acid-[3-(1-methylpropinyloxycarbonylamino)-phenyl]-ester,
N-(2-bromoethyl)-carbanilic acid-[3-(2-propinyloxycarbonylamino)-phenyl]-ester,
N-(2-chloroethyl)-carbanilic acid-[3-(2-propinyloxycarbonylamino)-phenyl]-ester,
N-(2-bromoethyl)-2-methylcarbanilic acid-[3-(methoxycarbonylamino)-phenyl]-ester,
N-(2-bromoethyl)-3-chlorocarbanilic acid-[3-(methoxycarbonylamino)-phenyl]-ester,
N-(2-bromoethyl)-2-methylcarbanilic acid-[3-(ethoxycarbonylamino)-phenyl]-ester,
N-(2-bromoethyl)-3-chlorocarbanilic acid-[3-(1-methylethoxycarbonylamino)-phenyl]-ester,
N-(2-bromoethyl)-carbanilic acid-[3-(2-methylpropoxycarbonylamino)-phenyl]-ester,
N-(2-bromoethyl)-3-chlorocarbanilic acid-[3-(2-methylpropoxycarbonylamino)-phenyl]-ester,
N-(2-chloroethyl)-3-methoxycarbanilic acid-]3-(methoxycarbonylamino)-phenyl]-ester,
N-(2-chloroethyl)-3-trifluoromethylcarbanilic acid-[3-methoxycarbonylamino)-phenyl]-ester and
N-(2-bromoethyl)-3-trifluoromethylcarbanilic acid-[3-(methoxycarbonylamino)-phenyl]-ester.

COMPOSITIONS CONTAINING THE COMPOUNDS OF THE INVENTION

The compounds of the invention can be used either by themselves and individually or as a mixture of several of the compounds or in conjunction with other active agents. Depending on the specific objective other defoliating agents, plant protection agents or pesticides may be added.

The action and speed of action can be increased for instance by additives such as organic solvents, cross-linking agents and oils. In that case the amount of active agent proper may be reduced.

The compounds of the invention or mixtures of different compounds of the invention can be used in the form of compositions such as powders, spreading compositions, granulates, solutions, emulsions or suspensions. With them may be used liquid or solid carrier materials or carrier materials of both types and diluents and, if desired, cross-linking agents, adhesion, emulsion and/or dispersion promoting agents.

Suitable liquid carrier materials are for instance water, aliphatic and aromatic hydrocarbons such as benzene, toluene, xylene, or derivatives thereof, such as cyclohexanone, isophorone, dimethylsulfoxide dimethylformamide and also mineral oil fractions.

As solid carrier materials there may be used clays and mineral materials as for instance tonsil, silica gel, talc, kaolin, attapulgite clay, limestone, silicic acid and plant products such as flours.

As surface active agents there may be used for instance calciumlignosulfonate, polyoxyethylene-alkylphenolether, naphthalenesulfone acids and their salts, phenolsulfone acids and their salts, formaldehyde condensates, fatty alcoholsulfates as well as substituted benzenesulfone acids and their salts.

The amount of active agent or agents in the total composition can be varied in a broad range. The compositions for instance may contain about 10 to 80% by weight of active agent, 90 to 20% by weight of liquid or solid carrier materials and possibly also up to 20% by weight of surface active agents.

The application of the compositions can be effected in conventional manner for instance with water as the carrier liquid in sprays of about 100 to 1000 liter per about 2.5 acres. The compounds may be used both in the so-called "low volume" and in the "ultra-low-volume" processes and they can also be used in the form of so-called microgranulates.

The making of the compositions can be effected in conventional manner, for instance by mixing or grinding. It is also possible that the individual components are mixed only immediately prior to their use such as it is done in the art in the so-called tank mixing processes.

MAKING OF THE COMPOUNDS OF THE INVENTION

The compounds of the invention can be made by conventional processes. For instance the following processes may be employed:

I. Compounds of the formula

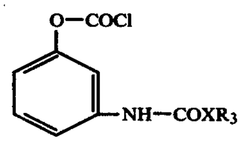

may be reacted with an amine of the formula

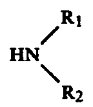

in the presence of an acid acceptor, for instance, by adding an excess of an amine or an inorganic base such as sodium hydroxide, sodium carbonate or potassium carbonate or a tertiary organic base, such as, triethylamine.

II. Compounds of the formula

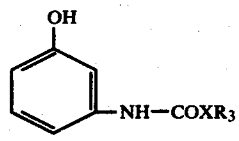

may be reacted in the presence of a tertiary organic base such as triethylamine or pyridine or in the form of an alkali salt with carbamoylchlorides of the formula

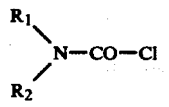

at a temperature between 0° and 100° C. Where $R_1$ is hydrogen, instead of the carbamoylchloride, there may also be used an isocyanate of the formula $$R_2—N=C=O$$

the reaction being carried out in the presence of a catalyst, preferably an organic base.

III. Where $R_1$ and $R_2$ are not readily hydrogenated, compounds of the formula

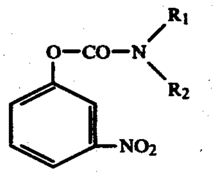

may first be hydrogenated catalytically for instance by using nickel in methanol to form the corresponding amine which subsequently is then reacted with compounds of the formula $$Cl—COXR_3$$

in the presence of an acid acceptor, for instance an inorganic base such as sodium hydroxide, sodium carbonate or potassium carbonate, or a tertiary organic base such as triethylamine.

In all these formulas which illustrate the process of making, $R_1$, $R_2$, $R_3$ and X have the same meaning as in the formula above given for the final compounds of the invention. A suitable temperature for these reactions, unless otherwise indicated (reaction II above), is around room temperature.

The following examples further illustrate the making of the compounds.

EXAMPLE

N-(2-chloroethyl)-carbanilic acid-[3-(methoxycarbonylamino)-phenyl]-ester

A solution of 22.9 g of chloroformic acid-3-methoxycarbonylaminophenylester in 50 ml acetic acid ester is added dropwise together with a solution of 30.5 g potassium carbonate in 150 ml water at a temperature of 10° to 15° C. into a solution of 23 g N-(2-chloroethyl)-aniline hydrochloride in 50 ml water and 50 ml acetic acid ester. During the addition the solutions are stirred. The stirring is then continued for 30 minutes at 15° C. whereupon the organic phase is separated, diluted with about 100 ml acetic acid ester and washed at 0° C. successively with dilute sodium hydroxide, water, dilute hydrochloric acid and again water. After drying on magnesium sulfate the mass is concentrated by evaporation under a reduced pressure. The residue obtained is at first oily but soon crystallizes throughout and is then recrystallized from acetic acid ester/pentane.

Yield: 30 g=86% of the theoretical value.

MP: 98° to 100° C.

In an analogous manner the following compounds may be made:

| Compounds | Physical constants |
|---|---|
| N-(2-bromoethyl)-carbanilic acid-[3-(methoxy-carbonylamino)-phenyl]-ester | MP: 88–90° C. |
| N-(2-bromoethyl)-carbanilic acid [3-(ethoxycarbonylamino)-phenyl]-ester | MP: 80–82° C. |
| N-(2-bromoethyl)-carbanilic acid [3-(methylthiocarbonylamino)-phenyl]-ester | MP: 118–120° C. |
| N-(2-bromoethyl)-carbanilic acid-[3-(ethylthiocarbonylamino)-phenyl]-ester | MP: 78–80° C. |
| N-(2-chloroethyl)-carbanilic acid-[3-ethoxycarbonylamino)-phenyl]-ester | MP: 71–73° C. |
| N-(2-chloroethyl)-carbanilic acid-[3-(methylthiocarbonylamino)-phenyl]-ester | MP: 122–124° C. |
| N-(2-chloroethyl)-carbanilic acid-[3-(ethylthiocarbonylamino)]phenyl]-ester | MP: 75–76° C. |
| N-(2-bromoethyl)-carbanilic acid-[3-(allyloxycarbonylamino)-phenyl]-ester | MP: 80–81° C. |
| N-(2-chloroethyl)-carbanilic acid-[3-(1-methylpropinyloxycarbonylamino)-phenyl]-ester | MP: 96–98° C. |
| N-(2-bromoethyl)-carbanilic acid-[3-(2-propinyloxycarbonylamino] phenyl]-ester | MP: 105–106° C. |
| N-(2-chloroethyl)-carbanilic acid-[3-(2-propinyloxycarbonylamino)-phenyl]-ester | MP: 121–123° C. |
| N-(2-bromoethyl)-3-chlorocanbanilic acid-[3-(1-methylethoxycarbonylamino)-phenyl]-ester | MP: 102–104° C. |
| N-(2-bromoethyl)-2-methylcarbanilic-acid-[3-methoxycarbonylamino)-phenyl]-ester | MP: 108–110° C. |
| N-(2-bromoethyl)-2-methylcarbanilic-acid-[3-(ethoxycarbonylamino)-phenyl]-ester | MP: 104–106° C. |
| N-(2-bromoethyl)-3-chlorocarbanilic acid-[3-(methoxycarbonylamino)-phenyl]-ester | MP: 100–102° C. |
| N-(2-chloroethyl)-carbanilic acid-[3-(2-methylpropoxycarbonylamino)-phenyl]-ester | MP: 95–96° C. |
| N-(2-bromoethyl)-2-methylcarbanilic-acid-[3-(1-methylethoxycarbonyl-amino)-phenyl]-ester | MP: 126–128° C. |
| N-(2-chloroethyl)-3-chlorocarbanilic-acid-[3-(methoxycarbonylamino)-phenyl]-ester | MP: 97–99° C. |
| N-(2-bromoethyl)-4-methylcarbanilic-acid-[3-(methoxycarbonylamino)-phenyl]-ester | MP: 101–103° C. |
| N-(2-bromoethyl)-3-chlorocarbanilic-acid-[3-(1-methylethoxycarbonyl-amino)-phenyl]-ester | MP: 102–104° C. |

-continued

| Compounds | Physical constants |
|---|---|
| N-(2-bromoethyl)-2-methylcarbanilic acid-[3-(methoxycarbonylamino)-phenyl]-ester | MP: 108–110° C. |
| N-(2-bromoethyl)-2-methylcarbanilic acid-[3-(ethoxycarbonylamino)-phenyl]-ester | MP: 104–106° C. |
| N-(2-bromoethyl)-3-chlorocarbanilic acid-[3-(methoxycarbonylamino)-phenyl]-ester | MP: 100–102° C. |
| N-(2-bromoethyl)-carbanilic acid-[3-(2-methylpropoxycarbonylamino)-phenyl]-ester | MP: 82–83° C. |
| N-(2-bromoethyl)-3-chlorocarbanilic acid-[3-(2-methylpropoxycarbonyl-amino)-phenyl]-ester | MP: 60–63° C. |
| N-(2-chloroethyl)-3-chlorocarbanilic acid-[3-(methoxycarbonylamino)-phenyl]-ester | MP: 97–99° C. |
| N-(2-bromoethyl)-4-methylcarbanilic acid-[3-(methoxycarbonylamino)-phenyl]-ester | MP: 101–103° C. |
| N-(2-bromoethyl)-3-chlorocarbanilic acid-[3-(methylthiocarbonylamino)-phenyl]-ester | MP: 152–154° C. |
| N-(2-bromoethyl)-2-methylcarbanilic acid-[3-(methylthiocarbonylamino)-phenyl]-ester | MP: 132° C. |
| 3-chloro-N-(2-chloroethyl)-carbanilic acid-[3-(ethoxycarbonylamino)-phenyl]-ester | MP: 89–91° C. |
| 3-chloro-N-(2-chloroethyl)-carbanilic acid-[3-(1-methylethoxycarbonyl-amino)-phenyl]-ester | MP: 103–105° C. |
| N-(2-bromoethyl)-4-methylcarbanilic acid-[3-(ethoxycarbonylamino)-phenyl]-ester | MP: 88–90° C. |
| 3-chloro-N-(2-chloroethyl)-carbanilic acid-[3-(methylthiocarbonylamino)-phenyl]-ester | MP: 140–142° C. |
| N-(2-chloroethyl)-carbanilic acid-[3-(1-methyl-2-propenyloxycarbonyl-amino)-phenyl]-ester | MP: 82–84° C. |
| 3-chloro-N-(2-chloroethyl)-carbanilic acid-[3-(2-methylpropoxycarbonyl-amino)-phenyl]-ester | $n_D^{20}$ = 1,5514 |
| N-(2-bromoethyl)-3-trifluoromethyl-carbanilic acid-[3-(ethoxycarbonyl-amino)-phenyl]-ester | MP: 73–75° C. |
| N-(2-bromoethyl)-4-methylcarbanilic acid-[3-(1-methylethoxycarbonylamino)-phenyl]-ester | MP: 79–81° C. |
| N-(2-bromoethyl)-3-trifluoromethyl-carbanilic acid-[3-(methoxycarbonyl-amino)-phenyl]-ester | MP: 86–88° C. |
| N-(2-bromoethyl)-3-trifluoromethyl-carbanilic acid-[3-(methylthio-carbonylamino)-phenyl]-ester | MP: 125–126° C. |
| N-(2-bromoethyl)-3-trifluoromethyl-carbanilic acid-[3-(1-methylethoxy-carbonylamino)-phenyl]-ester | MP: 85–87° C. |
| N-(2-bromoethyl)-3-methylcarbanilic acid-[3-(methoxycarbonylamino)-phenyl]-ester | MP: 106–108° C. |
| N-(2-bromoethyl)-4-chlorocarbanilic acid-[3-(methoxycarbonylamino)-phenyl]-ester | MP: 99–101° C. |
| N-(2-bromomethyl)-3-methylcarbanilic acid-[3-(ethoxycarbonylamino)-phenyl]-ester | MP: 91–93° C. |
| N-(2-bromoethyl)-4-chlorocarbanilic acid-[3-(ethoxycarbonylamino)-phenyl]-ester | MP: 80–82° C. |
| N-(2-bromoethyl)-4-chlorocarbanilic acid-[3-(1-methylethoxycarbonyl-amino)-phenyl]-ester | MP: 83–85° C. |
| N-(2-bromoethyl)-4-chlorocarbanilic acid-[3-(allyloxycarbonylamino)-phenyl]-ester | MP: 90–92° C. |
| N-(2-bromoethyl)-3-methylcarbanilic-acid-[3-(1-methylethoxycarbonyl- | MP: 127–129° C. |

-continued

| Compounds | Physical constants |
|---|---|
| amino)-phenyl]-ester | |
| N-(2-bromoethyl)-3-chlorocarbanilic acid-[3-(2-propinyloxycarbonyl-amino)-phenyl]-ester | MP: 115–117° C. |

The compounds are soluble in acetone, cyclohexanol, acetic acid ester, isophorone, ether, tetrahydrofuran and dimethylformamide. They are practically insoluble in water and light gasoline.

ACTIVITY OF THE COMPOUNDS

The following examples will further illustrate the activity of the compounds of the invention.

EXAMPLE 1

The plants listed in the tables below were treated in a hothouse by post-emergence application with the compounds listed in the tables in an amount of 3 kg of active agent per about 2.5 acres.

As control compounds there were used the following:

(1) 3-methoxycarbonylaminophenyl-N-(3-methylphenyl)-carbamate (2) 2,4-dichloro-phenoxyacetic acid.

The test products were young plants. The compositions were applied in the form of emulsions. The amount of liquid used was equivalent to 500 liter per about 2.5 acres. After 14 days the results were evaluated on a scale from 0=total destruction to 10=no injury to the plant.

The results appearing from the following tables clearly show the high compatibility with the agricultural products as against the control compounds which caused substantial damage to agricultural plants.

All amounts given in connection with the application of the compositions of the invention have been computed originally in relation to 1 hectare of land. Since 1 hectare in the Anglo-Saxon system equals 2.47 acres, the figures have been given in the specification for convenience as relating to about 2.5 acres.

| Compounds of invention | kg active agent/ about 2.5 acres | Po- ta- to | Maize (Indian corn) | Wheat | Bar- ley | Rice | Stel- la- ria m. | Se- ne- cio v. | Lam- ium a. | Cen- tau- rea c. | Ame- ran thus r. | Chry- san- the- mum s. | Ipo- mea p. | Poly- go- num c. | Gal- ium a. | Se- tar- ia i. | Poa a. | Echi- noch- loa c. g. | Digi- ta- ria s. | Ave- na f. | Alo- pecu- rus m. |
|---|---|---|---|---|---|---|---|---|---|---|---|---|---|---|---|---|---|---|---|---|---|
| N-(2-bromoethyl)-carbanilic acid-[3-(methoxy-carbonylamino)-phenyl]-ester | 3 | 10 | 10 | 10 | 10 | 10 | 0 | 0 | 0 | 0 | 0 | 0 | 0 | 0 | 0 | 0 | 0 | 0 | 0 | 1 | 2 |
| N-(2-bromoethyl)-carbanilic acid-[3-(ethoxycarbonylamino)-phenyl]-ester | 3 | 10 | 10 | 10 | 10 | 10 | 0 | 0 | 0 | 0 | 0 | 0 | 0 | 0 | 0 | 0 | 3 | 0 | 3 | 2 | — |
| N-(2-bromoethyl)-carbanilic acid-[3-(methylthiocarbonylamino)-phenyl]-ester | 3 | 8 | 10 | 10 | 10 | 10 | 0 | 0 | 0 | 0 | 0 | 0 | 0 | 0 | 0 | 0 | 5 | 4 | — | — | — |
| N-(2-bromoethyl)-carbanilic acid-[3-(ethylthiocarbonylamino)-phenyl]-ester | 3 | 10 | — | 10 | 10 | 10 | 0 | 0 | 0 | 0 | 0 | 0 | 0 | 0 | 2 | 0 | 3 | 0 | 0 | — | — |
| N-(2-chloroethyl)-carbanilic acid-[3-(methoxycarbonylamino)-phenyl]-ester | 3 | 10 | 9 | — | — | 10 | 0 | 0 | 0 | 0 | 0 | 0 | 0 | 0 | 2 | 0 | 3 | 0 | 3 | 2 | 5 |
| N-(2-chloroethyl)-carbanilic acid-[3-(ethoxycarbonylamino)-phenyl]-ester | 3 | — | — | 8 | — | 10 | 0 | 0 | 0 | 0 | 0 | 0 | 0 | 0 | 0 | 0 | 0 | 0 | 2 | 2 | 2 |
| N-(2-chloroethyl)-carbanilic acid [3-(methylthiocarbonylamino)-phenyl]-ester | 3 | — | 10 | — | — | 10 | 0 | 0 | 0 | 0 | 0 | 0 | 0 | 0 | 0 | 0 | 3 | 2 | 4 | — | — |
| N-(2-chloroethyl)-carbanilic acid [3-(ethylthiocarbonylamino)-phenyl]-ester | 3 | 8 | 10 | 10 | 10 | 10 | 0 | 0 | 0 | 0 | 0 | 0 | 0 | 0 | 0 | 0 | — | 5 | 1 | — | — |
| N-(2-bromoethyl)-carbanilic acid [3-(allyloxycarbonylamino)-phenyl]-ester | 3 | 10 | 10 | 10 | 10 | 10 | 0 | 0 | 0 | 0 | 0 | 0 | 0 | 0 | 1 | 0 | — | 2 | 2 | — | — |
| N-(2-chloroethyl)-carbanilic acid [3-(1-methylpropinyl-oxycarbonyl-amino)-phenyl]-ester | 3 | 10 | 10 | 10 | 10 | 10 | 0 | 0 | 0 | 0 | 0 | 0 | 0 | 0 | — | 0 | — | 3 | 0 | — | — |
| N-(2-bromoethyl)-carbanilic acid [3-(2-propinyloxycarbonylamino)-phenyl]-ester | 3 | — | 10 | 9 | 10 | 10 | 0 | 0 | 0 | 0 | 0 | 0 | 4 | 0 | 3 | 0 | 2 | 4 | 0 | — | — |
| N-(2-chloroethyl)-carbanilic acid [3-(propinyloxycarbonylamino)-phenyl]-ester | 3 | — | 10 | 9 | 10 | 10 | 0 | 2 | 0 | 0 | 0 | 0 | 0 | 0 | 0 | 0 | 3 | — | 0 | 4 | — |
| N-(2-bromoethyl)-2-methylcarbanilic acid-[3-(methoxycarbonyl-amino)-phenyl]-ester | 3 | 10 | 8 | 10 | 10 | 10 | 0 | — | 0 | 0 | 0 | 0 | 0 | 0 | — | 0 | 5 | — | 2 | — | — |
| N-(2-bromoethyl)-2-methylcarbanilic acid-[3-(ethoxycarbonyl-amino)-phenyl]-ester | 3 | 10 | 8 | 10 | 10 | 10 | 0 | — | 0 | 0 | 0 | 0 | 0 | 0 | — | 0 | — | — | 4 | — | — |
| N-(2-bromoethyl)-3-chlorcarbanilic acid-[3-(1-methylethoxycar-bonylamino)-phenyl]-ester | 3 | 10 | 9 | 10 | 10 | 10 | 0 | 0 | 0 | 0 | 0 | 0 | 2 | 0 | — | 0 | — | — | 4 | — | — |
| N-(2-chloroethyl)-carbanilic acid-(3-(2-methylpropoxy- | | | | | | | | | | | | | | | | | | | | | |

-continued

| Compounds of invention | kg active agent/ about 2.5 acres | Potato | Maize (Indian corn) | Wheat | Barley | Rice | Stellaria m. | Senecio v. | Lamium a. | Centaurea c. | Amaranthus r. | Chrysanthemum s. | Ipomea p. | Polygonum c. | Galium a. | Setaria i. | Poa a. | Echinochloa c. g. | Digitaria s. | Avena f. | Alopecurus m. |
|---|---|---|---|---|---|---|---|---|---|---|---|---|---|---|---|---|---|---|---|---|---|
| carbonylamino)-phenyl)-ester | 3 | 10 | 7 | 10 | 8 | 10 | 0 | 1 | 0 | 0 | 0 | 0 | 3 | 0 | — | 0 | — | 1 | 2 | — | — |
| N-(2-bromoethyl)-2-methyl-carbanilic acid-(3-(1-methyl-ethoxycarbonylamino)-phenyl)-ester | 3 | 10 | 10 | 10 | 10 | 10 | 3 | — | 2 | 2 | 0 | 0 | — | 0 | — | — | — | — | — | — | — |
| N-(2-chloroethyl)-3-chloro-carbanilic acid-(3-(methoxy-carbonylamino)-phenyl)-ester | 3 | 10 | 7 | 6 | 6 | 8 | 0 | 0 | 0 | 0 | 0 | 0 | 0 | 0 | 0 | 0 | 2 | 0 | 0 | — | 1 |
| N-(2-bromoethyl)-4-methyl-carbanilic acid-(3-(methoxy-carbonylamino)-phenyl-ester | 3 | 10 | 6 | 8 | 9 | 8 | 0 | 0 | 0 | 0 | 0 | 0 | 1 | 0 | — | 0 | 2 | 0 | 0 | — | — |
| N-(2-bromoethyl)-3-chloro-carbanilic acid-(3-(1-methyl-ethoxycarbonylamino)-phenyl)-ester | 3 | — | 10 | 10 | 10 | — | 0 | 0 | 0 | 0 | 0 | 0 | 7 | 1 | — | 0 | — | — | — | — | — |
| N-(2-bromoethyl)-2-methyl-carbanilic acid-(3-(methoxy-carbonylamino)-phenyl)-ester | 3 | — | 8 | 10 | 10 | — | 0 | 2 | 0 | 0 | 0 | 0 | 7 | 10 | — | 0 | — | — | — | — | — |
| N-(2-bromoethyl)-2-methyl-carbanilic acid-(3-(ethoxy-carbonylamino)-phenyl)-ester | 3 | — | 10 | 10 | 10 | — | 0 | 5 | 0 | 0 | 0 | 0 | 8 | 10 | — | 1 | — | — | — | — | — |
| N-(2-bromoethyl)-3-chloro-carbanilic acid-(3-(methoxy-carbonylamino)-phenyl)-ester | 3 | — | 7 | 8 | 8 | — | 0 | 0 | 0 | 0 | 0 | 0 | 0 | 0 | — | 0 | — | — | — | — | — |
| N-(2-(bromoethyl)-carbanilic acid-(3-(2-methylproproxy-carbonylamino)-phenyl)-ester | 3 | — | 8 | 10 | 10 | — | 0 | 0 | 0 | 3 | 0 | 0 | 10 | 0 | — | 1 | — | — | — | — | — |
| N-(2-bromoethyl)-3-chloro-carbanilic acid-(3-(2-methyl-propoxycarbonylamino)-phenyl)-ester | 3 | — | 10 | 10 | 10 | — | 3 | 8 | 1 | 1 | 0 | 8 | 10 | 4 | — | 7 | — | — | — | — | — |
| N-(2-chloroethyl)-3-chloro-carbanilic acid-(3-(methoxy-carbonylamino)-phenyl)-ester | 3 | — | 7 | 6 | 6 | — | 0 | 0 | 0 | 0 | 0 | 0 | 0 | 0 | — | 0 | — | — | — | — | — |
| N-(2-bromoethyl)-4-methyl-carbanilic acid(3-(methoxy-carbonylamino)-phenyl)-ester | 3 | — | 6 | 8 | 9 | — | 0 | 0 | 0 | 0 | 0 | 0 | 1 | 0 | — | 0 | — | — | — | — | — |
| N-(2-bromoethyl)-3-chloro- | | | | | | | | | | | | | | | | | | | | | |

-continued

| Compounds of invention | kg active agent/ about 2.5 acres | Potato | Maize (Indian corn) | Wheat | Barley | Rice | Stellaria m. | Senecio v. | Lamium a. | Centaurea c. | Ameranthus r. | Chrysanthemum s. | Ipomea p. | Polygonum c. | Galium a. | Setaria i. | Poa a. | Echinochloa c. g. | Digitaria s. | Avena f. | Alopecurus m. |
|---|---|---|---|---|---|---|---|---|---|---|---|---|---|---|---|---|---|---|---|---|---|
| carbanilic acid-3-methylthio-carbonylamino)-phenyl-ester | 3 | 10 | 10 | 8 | 8 | 8 | 0 | 0 | 0 | 0 | 0 | 0 | 0 | 0 | 2 | 0 | — | 1 | 0 | — | — |
| N-(2-bromoethyl)-2-methyl-carbanilic acid-[3-(methyl-thio-carbonylamino)-phenyl]-ester | 3 | 10 | 10 | 8 | 10 | 9 | 0 | 0 | 0 | 0 | 0 | 0 | 0 | 0 | — | 0 | — | 0 | 0 | — | — |
| 3-chloro-N-(2-chloroethyl)-carbanilic acid-(3-ethoxy-carbonylamino)-phenyl]-ester | 3 | 10 | 10 | 10 | 10 | 10 | 0 | 0 | 0 | 0 | 0 | 0 | 0 | 0 | 1 | 0 | — | 1 | 0 | — | — |
| 3-chloro-N-(2-chloroethyl)-carbanilic acid-[3-(1-methyl-ethoxycarbonylamino)-phenyl]-ester | 3 | 10 | 10 | 10 | 10 | 10 | 0 | 0 | 0 | 0 | 0 | 0 | 0 | 0 | 3 | 0 | — | 2 | 0 | — | — |
| N-(2-bromoethyl)-4-methyl-carbanilic acid-3-(ethoxy-carbonylamino)-phenyl-ester | 3 | 10 | 10 | 10 | 10 | 10 | 0 | 0 | 0 | 0 | 0 | 0 | 0 | 2 | — | 0 | — | 1 | 0 | — | — |
| 3-chloro-N-(2-chloroethyl)-carbanilic acid-3-(methylthio-carbonylamino)-phenyl-ester | 3 | 10 | 10 | 10 | 9 | 9 | 0 | 0 | 0 | 0 | 0 | 0 | 0 | 0 | 1 | 0 | 4 | — | 0 | — | — |
| N-(2-chloroethyl)-carbanilic acid-3-(1-methyl-2-propenyl-oxycarbonylamino)-phenyl-ester | 3 | 10 | 10 | 10 | 10 | 10 | 0 | 0 | 0 | 0 | 0 | 0 | 0 | 0 | — | 4 | — | — | 3 | — | — |
| 3-chloro-N-(2-chloroethyl)-carbanilic acid-3-(2-methyl-propoxycarbonylamino)-phenyl-ester | 3 | 10 | 10 | 10 | 10 | 10 | 0 | 0 | 0 | 1 | 0 | 0 | 0 | 0 | — | 2 | — | — | 2 | — | — |
| N-(2-bromoethyl)-3-trifluoro-methyl-carbanilic acid-[3-(ethoxycarbonylamino)-phenyl]-ester | 3 | 10 | 10 | 10 | 10 | 10 | 0 | 0 | 0 | 0 | 0 | 0 | 0 | 0 | 0 | 0 | — | 4 | 1 | 5 | — |
| N-(2-bromoethyl)-4-methyl-carbanilic acid-[3-(1-methyl-ethoxycarbonylamino)-phenyl]-ester | 3 | 10 | 10 | 10 | 10 | 10 | 0 | 0 | 0 | 0 | 0 | 0 | 3 | 0 | 2 | 1 | — | — | 3 | — | — |
| N-(2-bromoethyl)-3-trifluoro-methyl-carbanilic acid-[3-(methoxycarbonylamino)-phenyl]-ester | 3 | 10 | 10 | 10 | 10 | 10 | 0 | 0 | 0 | 0 | 0 | 0 | 0 | 2 | 0 | 0 | 4 | 5 | 1 | 0 | — |
| N-(2-bromoethyl)-3-trifluoro-methyl-carbanilic acid-[3-(methylthiocarbonylamino)-phenyl]-ester | 3 | 10 | 10 | 10 | 10 | 10 | 0 | 0 | 0 | 0 | 0 | 0 | 0 | 3 | 0 | 1 | 4 | — | 3 | — | — |
| N-(2-bromoethyl)-3-trifluoro- | | | | | | | | | | | | | | | | | | | | | |

-continued

| Compounds of invention | kg active agent/ about 2.5 acres | Potato | Maize (Indian corn) | Wheat | Barley | Rice | Stellaria m. | Senecio v. | Lamium a. | Centaurea c. | Ameranthus r. | Chrysanthemum s. | Ipomea p. | Polygonum c. | Galium a. | Setaria i. | Poa a. | Echinochloa c. g. | Digitaria s. | Avena f. | Alopecurus m. |
|---|---|---|---|---|---|---|---|---|---|---|---|---|---|---|---|---|---|---|---|---|---|
| methyl-carbanilic acid-[3-(1-methylethoxycarbonyl-amino)-phenyl]-ester | 30 | 10 | 10 | 8 | 10 | 10 | 0 | 0 | 0 | 0 | 0 | 0 | 0 | 0 | 0 | 4 | 4 | — | 4 | 5 | — |
| N-(2-bromoethyl)-3-methyl-carbanilic acid-[3-(methoxy-carbonylamino)-phenyl]-ester | 3 | 10 | 8 | 10 | — | — | 1 | 2 | 0 | 4 | — | 0 | 4 | 0 | 5 | 0 | — | 5 | — | 2 | 4 |
| N-(2-bromoethyl)-4-chloro-carbanilic acid-[3-(methoxy-carbonylamino)-phenyl]-ester | 3 | 10 | 8 | 8 | 8 | 8 | 0 | 0 | 0 | 0 | 0 | 0 | 0 | 0 | 0 | 0 | 3 | — | 5 | 2 | — |
| N-(2-bromoethyl)-3-methyl-carbanilic acid-[3-(ethoxy-carbonylamino)-phenyl]-ester | 3 | 10 | 10 | 10 | 8 | 8 | 0 | 0 | 0 | 0 | 0 | 0 | 0 | 0 | 0 | 0 | — | — | — | — | — |
| N-(2-bromoethyl)-4-chloro-carbanilic acid-[3-(ethoxy-carbonylamino)-phenyl]-ester | 3 | 10 | 10 | 10 | 10 | 10 | 0 | 0 | 0 | 0 | 0 | 0 | 0 | 0 | 0 | 0 | 0 | — | — | — | — |
| N-(2-bromoethyl)-4-chloro-carbanilic acid-[3-(1-methyl-ethoxycarbonylamino)-phenyl]-ester | 3 | 10 | 10 | 10 | 10 | 10 | 0 | 0 | 0 | 0 | 0 | 0 | 0 | 2 | 0 | 1 | — | — | — | 4 | — |
| N-(2-Bromoethyl)-4-chloro-carbanilic acid-[3-(allyl-oxycarbonylamino)-phenyl]-ester | 3 | 10 | 10 | 10 | 10 | 10 | 0 | 0 | 0 | 0 | 0 | 0 | 0 | 0 | 3 | — | — | — | — | — | — |
| N-(2-bromoethyl)-3-methyl-carbanilic acid-[3-(1-methyl-ethoxycarbonylamino)-phenyl] ester | 3 | 10 | 10 | 10 | 10 | 10 | 1 | 4 | 0 | 2 | 0 | 0 | 0 | 0 | 0 | — | — | — | — | — | — |
| <u>Control compounds</u> | | | | | | | | | | | | | | | | | | | | | |
| 3-methoxycarbonylaminophenyl-N-(3-methylphenyl)-carbamate | 3 | 8 | — | — | — | 8 | 0 | 0 | 0 | 0 | 0 | 0 | 0 | 0 | 0 | 1 | 1 | 4 | 5 | 2 | 5 |
| 2,4-dichloro-phenoxy-acetic acid | 3 | 8 | 10 | 8 | 8 | — | 0 | 0 | 0 | 0 | 0 | 0 | 0 | 0 | 3 | 2 | 2 | 3 | 4 | 5 | 3 |

We claim:

1. A carbanilic acid ester of the formula

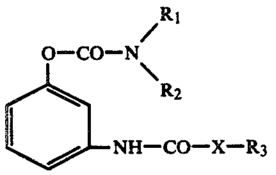

in which $R_1$ is chloro- or bromoalkyl, $R_2$ is phenyl, methylphenyl, halogenophenyl, trifluoromethylphenyl or methoxyphenyl, $R_3$ is straight chain or branched alkyl, alkenyl, or alkinyl, the number of carbon atoms in all these groups being 1 to 4, and in which X is oxygen or sulfur.

2. The compound of claim 1 wherein $R_1$ is chloro- or bromoethyl.

3. The compound of claim 1 which is N-(2-bromoethyl)-carbanilic acid-[3-(methoxycarbonylamino)-phenyl]-ester.

4. The compound of claim 1 which is N-(2-bromoethyl)-carbanilic acid-[3-(ethoxycarbonylamino)-phenyl]-ester.

5. The compound of claim 1 which is N-(2-bromoethyl)-carbanilic acid-[3-(methylthiocarbonylamino)-phenyl]-ester.

6. The compound of claim 1 which is N-(2-bromoethyl)-carbanilic acid-[3-(ethylthiocarbonylamino)-phenyl]-ester.

7. The compound of claim 1 which is N-(2-chloroethyl)-carbanilic acid-[3-(methoxycarbonylamino)-phenyl]-ester.

8. The compound of claim 1 which is N-(2-chloroethyl)-carbanilic acid-[3-ethoxycarbonylamino)-phenyl]-ester.

9. The compound of claim 1 which is N-(2-chloroethyl)-carbanilic acid-[3-(methylthiocarbonylamino)-phenyl)-ester.

10. The compound of claim 1 which is N-(2-chloroethyl)-carbanilic acid-[3-ethylthiocarbonylamino)-phenyl]-ester.

11. The compound of claim 1 which is N-(2-bromoethyl)-carbanilic acid-[3-(allyloxycarbonylamino)-phenyl]-ester.

12. The compound of claim 1 which is N-(2-chloroethyl)-carbanilic acid-[3-(1-methylpropinyloxycarbonylamino)-phenyl]-ester.

13. The compound of claim 1 which is N-(2-bromoethyl)-carbanilic acid-[3-(2-propinyloxycarbonylamino)-phenyl]-ester.

14. The compound of claim 1 which is N-(2-chloroethyl)-carbanilic acid-[3-(2-propinyloxycarbonylamino)-phenyl]-ester.

15. The compound of claim 1 which is N-(2-bromoethyl-2-methylcarbanilic acid-[-(methoxycarbonylamino)-phenyl]-ester.

16. The compound of claim 1 which is N-(2-bromoethyl)-3-chlorocarbanilic acid-[3-methoxycarbonylamino)-phenyl]-ester.

17. The compound of claim 1 which is N-(2-bromoethyl)-2-methylcarbanilic acid-[3-(ethoxycarbonylamino)-phenyl]-ester.

18. The compound of claim 1 which is N-(2-bromoethyl)-3-chlorocarbanilic acid-[3-(1-methylethoxycarbonylamino)-phenyl]-ester.

19. The compound of claim 1 which is N-(2-bromoethyl)-carbanilic acid-[3-(2-methylpropoxycarbonylamino)-phenyl]-ester.

20. The compound of claim 1 which is N-(2-bromoethyl)-3-chlorocarbanilic acid-[3-(2-methylpropoxycarbonylamino)-phenyl]-ester.

21. The compound of claim 1 which is N-(2-chloroethyl)-3-methoxycarbanilic acid-[3-methoxycarbonylamino)-phenyl]-ester.

22. The compound of claim 1 which is N-(2-chloroethyl)-3-trifluoromethylcarbanilic acid-[3-(methoxycarbonylamino)-phenyl]-ester.

23. The compound of claim 1 which is N-(2-bromoethyl)-3-trifluoromethylcarbanilic acid-[3-(methoxycarbonylamino)-phenyl]-ester.

24. A herbicidal composition comprising from about 10 to about 80% by weight of at least one active agent constituted by a compound according to claim 1, and about 90 to 20% by weight of a liquid or solid carrier material or both of these types of carrier materials.

25. The composition of claim 24 which additionally includes up to 20% by weight of surface active agent with a corresponding reduction of the carrier material.

26. The herbicidal composition of claim 24 which is compatible with potatoes.

* * * * *